US000001976H

(19) United States

(12) Statutory Invention Registration (10) Reg. No.: US H1976 H

Lambrakos et al. (43) Published: Aug. 7, 2001

(54) CORROSION CONTROL IN HOLLOW FRAME STRUCTURES

(75) Inventors: Samuel G. Lambrakos; Harry Jones, III, both of Alexandria; Patricia Paulette, Falls Church, all of VA (US)

(73) Assignee: The United States of America as represented by the Secretary of the Navy, Washington, DC (US)

(21) Appl. No.: 09/363,835

(22) Filed: Jul. 30, 1999

(51) Int. Cl.[7] ..... B23P 15/00

(52) U.S. Cl. ..... 29/527.2; 29/527.1; 264/46.6

(58) Field of Search ..... 29/527.2, 527.4, 29/527.1; 264/46.6, 46.7

(56) References Cited

U.S. PATENT DOCUMENTS

| | | | | |
|---|---|---|---|---|
| 4,269,890 | * | 5/1981 | Breitling et al. | 428/71 |
| 5,653,494 | | 8/1997 | Cleall et al. | 296/182 |
| 5,690,378 | | 11/1997 | Romesburg | 296/181 |
| 5,700,050 | * | 12/1997 | Gonas | 264/46.6 |
| 5,866,052 | * | 2/1999 | Muramatsu | 264/46.6 |
| 5,962,142 | * | 10/1999 | Tachi et al. | 264/46.6 |
| 6,068,802 | * | 5/2000 | Berghorn et al. | 264/46.6 |

OTHER PUBLICATIONS

Jones et al.; An Evaluation of Some Corrosion Control Techniques for Marine Corps HMMWV Frame Rails; NRL/MR/6321–98–8150; Mar. 31, 1998.

Paulette et al.; A Post–Design Corrosion Inhibition Technique for Marine Corps Light Vehicles; Proc. Tri–Service Corr. Conf.; Nov. 17–20, 1997 Brightsville Beach, NC.

Paulette et al.; Corrosion Control in Enclosed Areas of Military Ground Vehicles; Corrosion '98, Paper No. 607 pp. 1–11, Mar 24–27, 1998.

Paulette et al; Characteristics OP Rigid Polymer Foams as Related to Their Use for Corrosion Protection in Enclosed Metal Spaces; Corrosion '99 Paper No. 510, Apr. 25–30, 1999.

Paulette et al., Corrosion, May 1999, Closed Cell Polymer Foams for Corrosion Control in Confined Metal Spaces.

* cited by examiner

*Primary Examiner*—Harold J. Tudor

(74) *Attorney, Agent, or Firm*—Barry A. Edelberg; Charles J. Stockstill

(57) ABSTRACT

Corrosion protection in hollow metal structures is attained by placing an injected, foam-in-place, closed cell plastic polymer foam into an interior of a hollow metal structure, thereby preventing the ingress of foreign matter, such as dirt or water.

8 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CORROSION CONTROL IN HOLLOW FRAME STRUCTURES

BACKGROUND OF THE INVENTION

1. Field of the Invention

This invention pertains generally to corrosion prevention on the surfaces of hollow metal structures, more specifically the placement of a plastic polymer foam material in the box section frame rails of a vehicle to prevent corrosion from salt water collection or condensation in the frame rails.

2. Description of the Related Art

Corrosion control methods are generally based on the principle of shielding metal surfaces from their environment through the application of fluid or vapor impervious surface layers or coatings. These layers can be formed from a variety of materials including oils and greases, paints, inhibiting surface films, inactive metal overlays, or thickened oxide layers. Coating reliability depends on adhesion strength and resistance to ultraviolet light, heat, mechanical, or moisture induced degradation.

Hollow cavities are an intrinsic design feature of metallic structures. For vehicles located near salt water, particularly these cavities tend to collect salt laden moisture which in turn promotes accelerated corrosion of the internal surfaces. Corrosion damage inside structural voids results in premature component failures, significantly shortened lifetimes, and high repair or replacement costs. Internal cavity corrosion is commonly observed in automobiles and trucks causing some vehicles to be removed from service in less than one quarter of their design lifetimes and resulting in high repair costs. For example, the beach vehicles utilized by the Los Angeles County Parks and Harbors Department are retired from service after approximately two years even though they are rinsed with salt-free water daily.

The use of corrosion control treatments such as, paints, oils, or inhibiting coatings, for hollow components is often impracticable because of the fact that there is inadequate accessibility for application. Inaccessibility also reduces the effectiveness of cleaning and surface preparations necessary for corrosion product removal prior to the application of coatings. Application of coatings prior to assembly is not always feasible because of possible deleterious effects of welding on the coating. Providing drainage is only effective if all moisture and residue can be eliminated or the interior surfaces have a good corrosion preventive coating.

Plastic foams are widely used for building insulation and recreational boat hulls, as a material for flotation devices and as space fillers to avoid maintenance in steel sail boat construction. Although corrosion control is not the primary purpose for foam application in these applications, it has been noted that virtually no corrosion appears on foam encased steel spade rudders, even after prolonged periods of ocean sailing. In the early 1960s foam fillers were explored as a corrosion control method for automotive body applications. This concept was subsequently abandoned because of void and shrinkage problems associated with the foam formulations then available. It has been shown that stainless steel, galvanized iron, and copper appear to be protected by contact with some rigid insulating polyurethane foams, however for mild steel and aluminum the protection afforded is significantly less. It has been suggested that in the latter cases, detrimental species will leach from the foam under conditions of high humidity and condensation and support corrosion attack at the foam metal interface.

BRIEF SUMMARY OF THE INVENTION

The object of this invention is to provide a technique for preventing or inhibiting corrosion in the frame rails of vehicles subjected to a corrosive atmosphere where there can be already existing levels of internal surface degradation or corrosion.

This and other objectives are attained by placing an injected, foam-in-place, closed cell plastic polymer foam into an interior of a hollow metal structure, thereby preventing the ingress of foreign matter, such as dirt or water and corrosion species. The protective foam can be applied to unused equipment or equipment that is partially corroded during operation.

DETAILED DESCRIPTION OF THE INVENTION

Figure 1:
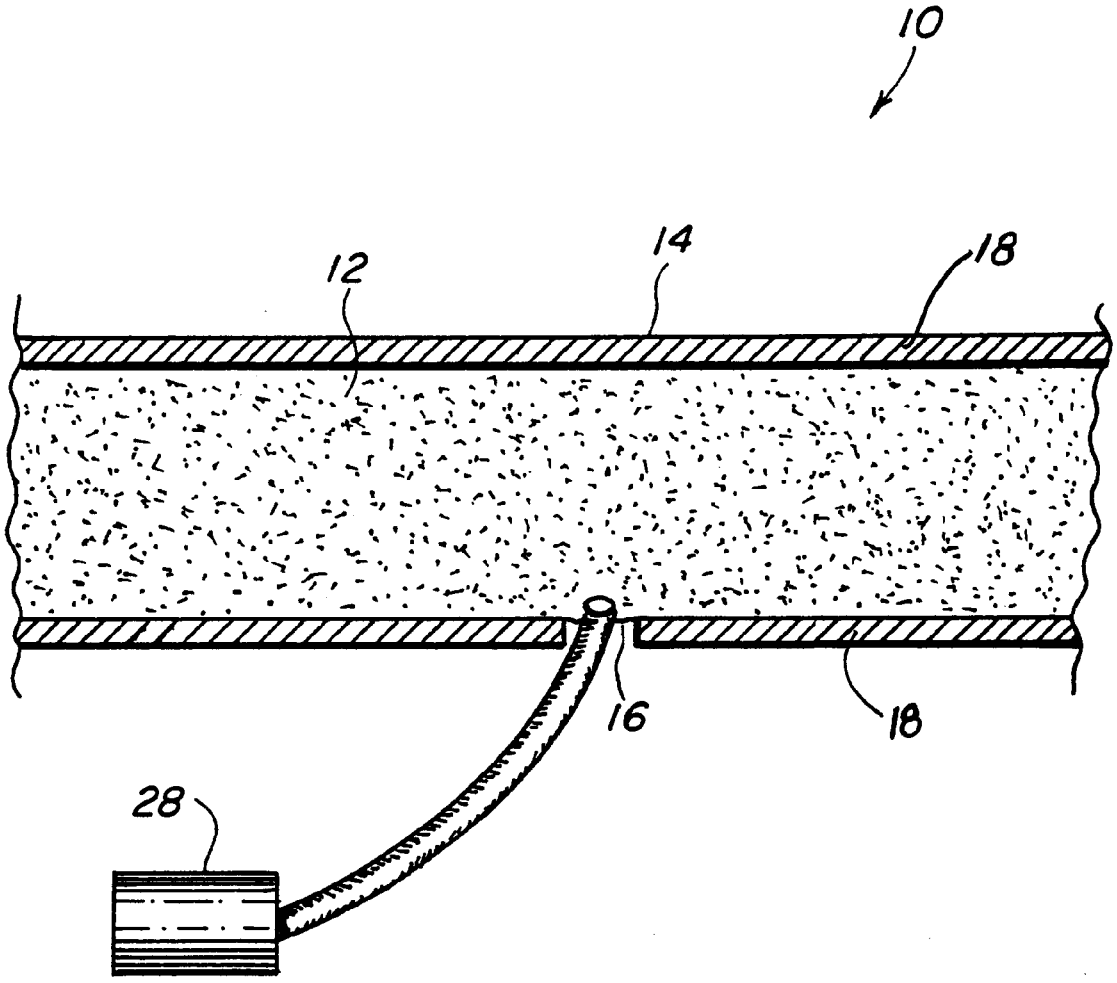
FIG. 1 shows a schematic representation of an enclosed metal region containing a semi-rigid filler material representative of a cured closed cell foam polymer foam.

The foam filling approach to corrosion control, as described below in the preferred embodiment 10, as shown in FIG. 1, uses an expansive plastic foam as a filler material 12 to infiltrate and occupy enclosed metal cavities, empty structural spaces 14 in order to block corrosive fluid entry and contact with metal surfaces. The properties of the filler material 12 necessary to maintain a fluid or vapor barrier will depend upon the geometry and condition of the cavity 14. In the worst condition the enclosed metal region 14 contains internal structures which form the sides of clamping or bolting arrangements and drain holes or access points 16 which permit entry or discharge of fluid or semi-fluid materials. For this situation, under ideal conditions, the general spatial and temporal morphology of the filler material 12, should be such that: (1) it can be deposited at various locations within the confined region by means of injection at preexisting access points 16, (2) it is able to flow or expand into all unoccupied regions regardless of size or geometry, (3) it is characterized by a curing time for transition from a liquid state to that of a rigid or semi-rigid state. (4) it is sufficiently dense and expansive during curing that a reasonable level of pressure is maintained at the interior surface of the metal structure 14 or interface between metal 18 forming the cavity 14 and filler material 12 and, (5) it possesses sufficient fluid repellence to block contact with the internal surface 18 of the metal structure 14. In addition, because the filler material 12 represents a post design solution, its presence should not alter the behavior of the structure associated with the specified enclosed region.

Referring to FIG. 1, a filler material 12 is introduced into a cavity 14 region through existing or selectively drilled access points 16 in a liquid or highly amorphous state. The foam material 12 is applied through a drain hole or selectively drilled access point 16 into a hollow metal structure 14 having an interior surface 18, preferably without a paraffin coating that has been applied by a manufacturer as a rust proofing. The interior surface of the hollow metal structure 14, however, may be in a corroded state. Immediately following disposition, the filler material 12 begins to expand wherein foaming and hardening will occur. The evolution rate of this gas and availability of moisture containing air, as influenced by the venting conditions through existing or selectively drilled access points 16, can determine the structure and morphology of the final product. The filler material 12 assumes a rigid outer skin at surfaces that are in the proximity of either access points 16 or areas where there is an open venting. The internal cell structure can develop over a period of several days, and is a function of the preexpansion conditions within the confined region or cavity 14 which may not be uniform. And finally, there is some level of bonding at the interface 18 between the filler material 12 and the metal surface 18.

The preferred filler material 12 is a polymeric diisocynate polyol resin mixture, such as Foam Plus®, manufactured by Insta Foam of Jolliet, Ill., however other materials that meet the criteria described herein may be utilized, such as a two-part polyurethane foam. The preferred mixture cures with a closed-cell morphology, has good metal bonding characteristics and is available in pressurized containers with a plastic tube extension for easy application into poorly accessible areas. Following deposition, expansion, and curing the expanded filler material 12 fills the hollow metal structure 14. The interior morphology depends upon the size of the cavity 14 and the availability of external access providing moisture to set the foam and venting to allow release of the expansion gas. If there is inadequate external access there is insufficient moisture for proper curing and volume for gas expansion so that voids or channels can form. Despite the formation of voids for the most part a small sized cellular structure forms at metal contact points. Where the filler material 12 does not expand, a thin transparent material forms on the metal structure 14.

The general morphology of a one part foamed filler material 12 within an enclosed cavity region 14 will tend to be different from that of a partially enclosed region or a region that is defined by materials through which the diffusion of gases can readily occur. Under ideal conditions curing and expansion rates are complementary and the final product will consist of a uniformly sized cell material. However, under less than ideal conditions, various factors can influence the morphology of the cured material and possibly its utility for water displacement and exclusion. Some of these factors include:

(1) Set-up rate. To insure a morphologically uniform product the rate of solidification immediately following deposition will decide the tolerable separation distances between access points 16 and deposition locations within the cavity 14.

(2) Venting. For single component expansive foams, poor venting during the curing process restricts the escape of the gaseous expansion agent and access of moisture which can result in the formation of voids or a liquefied internal phase. These cells may preferably absorb and harbor, rather than displace environmental fluids.

(3) Bonding. Poor metal-polymer bonding could result in wicking of fluids along the interface.

(4) Curing. For single component expansive foams, restricted access to air delays the curing process and results in an unexpanded liquified phase which eventually hardens.

For precorroded surfaces, a pressure wash, such as water, removes loose corrosion products and debris and provides an improved surface for bonding.

The corrosion control techniques described in this invention will prevent the accumulation of foreign materials, such as dirt and water, within a hollow metal structure, such as a vehicular frame rail and thereby prevent corrosion of this component. The techniques described may be applied to new construction or retrofitted to apparatuses already in service. Laboratory tests indicate that injection of a closed-cell foam filler material 12 offers a promising retrofit solution to corrosion control inside structural cavities 14 that are exposed to periodic seawater immersion and may already possess a level of internal surface degradation.

Although this invention has been described in relation to an exemplary embodiment thereof, it will be understood by those skilled in the art that still other variations and modifications can be affected in the preferred embodiment without detracting from the scope and spirit of the invention as described in the claims.

What is claimed:

1. A technique for preventing corrosion in hollow metal structures comprising:

application of an expanding plastic polymer material into a hollow metal structure to act as a barrier to an environment containing corrosion causing species.

2. A technique, as in claim 1, wherein the plastic polymer material is a closed cell plastic polymer foam.

3. A technique, as in claim 2, wherein the plastic polymer material is a polymeric diisocynate resin.

4. A technique for preventing corrosion in hollow metal structures comprising:

a closed cell plastic polymer foam injected into the hollow metal structure; and means for injecting the resin mixture into the hollow metal structure.

5. A method for corrosion proofing a hollow metal structure, said hollow metal structure having an interior and exterior surface, comprised of the steps of:

drilling a plurality of access holes into the hollow metal structure;

preparing the interior surface, when precorroded, of the hollow metal structure; and injecting an expanding plastic polymer material through said access holes into the interior of the hollow metal structure from a pressurized dispenser.

6. A method for corrosion proofing a hollow metal structure, said hollow metal structure having an interior and exterior, comprised of the steps of:

drilling a plurality of access holes into the hollow metal structure or utilizing existing access holes;

preparing the interior surface, when precorroded, of the hollow metal structure; and injecting a closed cell plastic polymer foam material through said access holes into the interior of the hollow metal structure from a pressurized dispenser.

7. A method for corrosion proofing a hollow metal structure, said hollow metal structure having an interior and exterior, comprised of the steps of:

drilling a plurality of access holes into the hollow metal structure or utilizing existing access holes;

preparing the interior surface, when precorroded, of the hollow metal structure; and injecting a polymeric diisocynate polyol resin mixture through said access holes into the interior of the hollow metal structure from a pressurized dispenser.

8. A technique for preventing corrosion in hollow metal structures comprising:

a polymeric diisocynate polyol resin injected into the hollow metal structure; and means for injecting the resin into the hollow metal structure.

* * * * *